United States Patent
Nagasawa

(10) Patent No.: US 11,207,927 B2
(45) Date of Patent: Dec. 28, 2021

(54) PNEUMATIC TIRE

(71) Applicant: Sumitomo Rubber Industries, Ltd., Kobe (JP)

(72) Inventor: Koki Nagasawa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 626 days.

(21) Appl. No.: 16/053,254

(22) Filed: Aug. 2, 2018

(65) Prior Publication Data

US 2019/0084356 A1 Mar. 21, 2019

(30) Foreign Application Priority Data

Sep. 21, 2017 (JP) .............................. JP2017-181559

(51) Int. Cl.
 *B60C 13/02* (2006.01)
 *B60C 13/00* (2006.01)
 *B60C 11/01* (2006.01)

(52) U.S. Cl.
 CPC .............. *B60C 13/02* (2013.01); *B60C 11/01* (2013.01); *B60C 13/00* (2013.01); *B60C 13/002* (2013.01); *B60C 2200/14* (2013.01)

(58) Field of Classification Search
 CPC ........ B60C 13/002; B60C 13/02; B60C 11/01
 See application file for complete search history.

(56) References Cited

U.S. PATENT DOCUMENTS

2012/0073719 A1* 3/2012 Kurosawa ............. B60C 13/002
 152/523
2012/0216930 A1* 8/2012 Matsuda ................ B60C 11/11
 152/209.18

FOREIGN PATENT DOCUMENTS

JP 2016-55820 A 4/2016

* cited by examiner

*Primary Examiner* — Alison L Hindenlang
*Assistant Examiner* — George W. Brady
(74) *Attorney, Agent, or Firm* — Birch, Stewart, Kolasch & Birch, LLP

(57) ABSTRACT

A pneumatic tire includes a pair of sidewall portions. At least one of the pair of sidewall portions is provided with circumferentially spaced protrusions protruding axially outwardly. Each of the protrusions includes a first end in a tire circumferential direction and a recess extending in the tire circumferential direction from the first end and having a terminal end terminating within the protrusion.

18 Claims, 4 Drawing Sheets

PNEUMATIC TIRE

BACKGROUND ART

Field of the Disclosure

The present disclosure relates to a pneumatic tire having a pair of sidewall portions.

Description of the Related Art

The following Patent Literature 1 discloses a pneumatic tire which includes a pair of sidewall portions provided with protrusions protruding axially outwardly on the outer surface in order to suppress damages of the sidewall portions while improving off-road traveling performance.

Unfortunately, the protrusions disclosed in the above literature tend to increase a rubber thickness of the sidewall portions, resulting in deteriorating durability of the tire due to heat accumulated therein. Further, the tire as such is expected to generate powerful traction in mud road conditions.

PATENT LITERATURE

[Patent Literature 1] Japanese Unexamined Patent Application Publication 2016-55820

SUMMARY OF THE DISCLOSURE

In view of the above problems in the conventional art, the present disclosure has an object to provide a pneumatic tire capable of improving durability of the sidewall portions as well as traction in mud road conditions.

According to the present disclosure, a pneumatic tire includes a pair of sidewall portions. At least one of the pair of sidewall portions is provided with circumferentially spaced protrusions protruding axially outwardly. Each of the protrusions includes a first end in a tire circumferential direction and a recess extending in the tire circumferential direction from the first end and having a terminal end terminating within the protrusion.

In another aspect of the disclosure, at least a part of one of the protrusions may appear in an arbitrary tire meridian cross-section including a tire axis.

In another aspect of the disclosure, the recess may have a width measured along the first end, and the width decreases gradually toward the terminal end.

In another aspect of the disclosure, the recess may have a maximum width measured along the first end, and the maximum width is in a range of from 0.4 to 0.6 times an entire length of the first end.

In another aspect of the disclosure, each of the protrusions may include a first portion having a first protruding height and a second portion having a second protruding height lower than the first protruding height.

In another aspect of the disclosure, the second protruding height may be in a range of from 0.5 to 0.7 times the first protruding height.

In another aspect of the disclosure, the first portion may include an outer rib portion located radially outwardly of the recess, an inner rib portion located radially inwardly of the recess, and a base portion connecting the outer rib portion and the inner rib portion.

In another aspect of the disclosure, each of the protrusions may include a second end in the tire circumferential direction at an opposite side to the first end, and the second portion is arranged on the second end side of the base portion.

In another aspect of the disclosure, a circumferential length of the second portion may increase toward radially outward gradually or stepwisely.

In another aspect of the disclosure, the second portion may extend radially outwardly from a radially inner end of the protrusion, and the second portion may include a narrow portion having a constant circumferential length, and a wide portion arranged radially outwardly of the narrow portion and having a circumferential length larger than the circumferential length of the narrow portion.

In another aspect of the disclosure, the wide portion may have a maximum length along the second end in a range of from 0.3 to 0.5 times an entire length of the second end.

DESCRIPTION OF THE PREFERRED EMBODIMENTS

Figure 1:
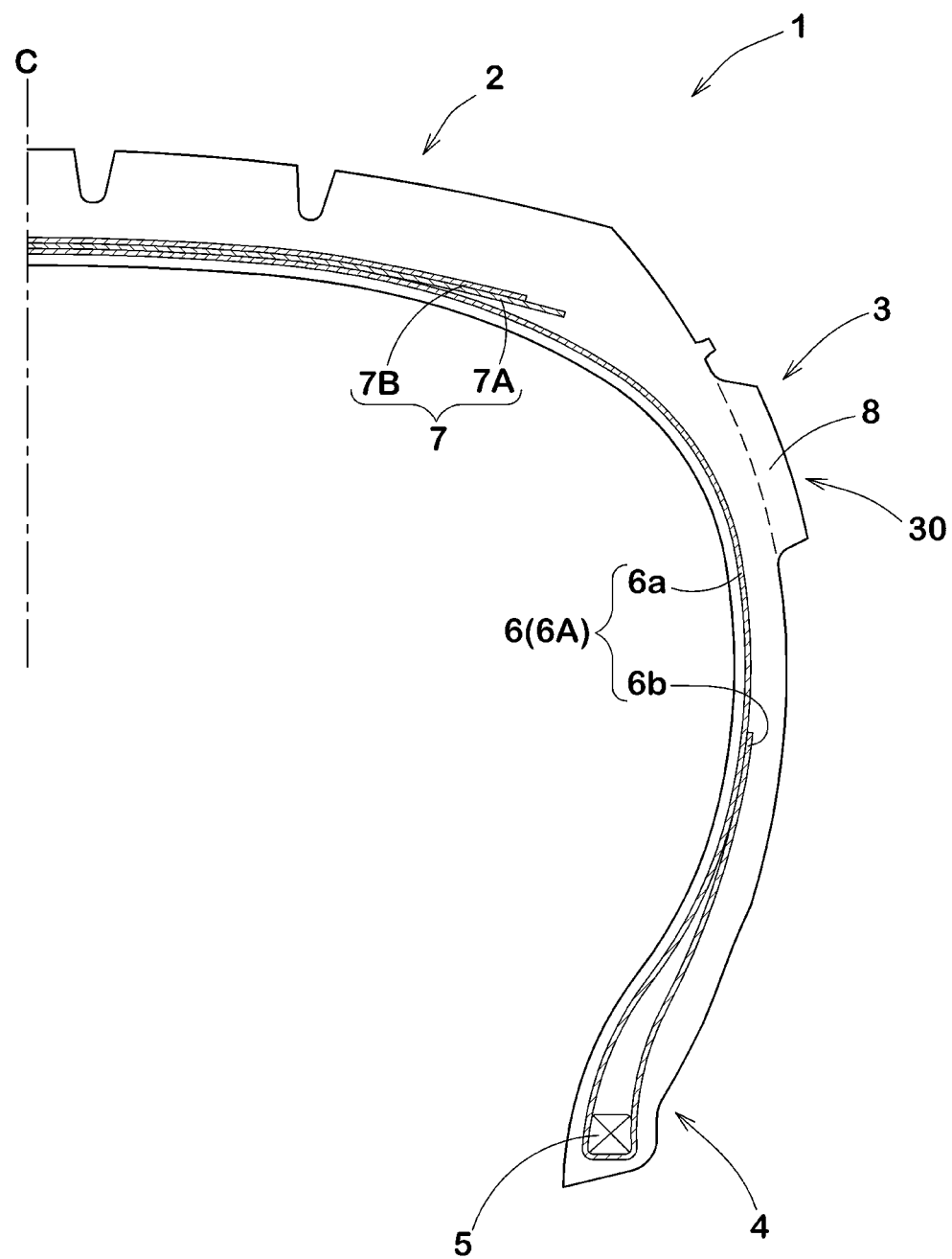
FIG. 1 is a cross-sectional view of a pneumatic tire in accordance with an embodiment of the disclosure.

An embodiment of the present disclosure will be explained below with reference to the accompanying drawings. FIG. 1 illustrates a tire meridian cross-sectional view including a tire axis of a pneumatic tire 1 under a standard condition in accordance with an embodiment of the disclosure.

As used herein, the standard condition of the tire 1 is such that the tire 1 is mounted onto the standard wheel rim (not illustrated) and inflated to a standard pressure but loaded with no tire load. In this application including specification and claims, various dimensions, positions and the like of the tire 1 refer to those under the standard condition of the tire unless otherwise noted.

As used herein, the standard wheel rim is a wheel rim officially approved or recommended for the tire 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire 1 by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the pneumatic tire (hereinafter, simply referred to as the "tire") 1 includes a tread portion 2, a pair of sidewall portions 3 and a pair of bead portions 4 each with a bead core 5 therein, a carcass 6 extending between the bead cores 5 through the tread portion 2 and the pair of sidewall portions 3, and a belt layer 7 disposed radially outwardly of the carcass 6 in the tread portion 2. In the embodiment, a passenger car tire is illustrated, for example.

The carcass 6, for example, includes one carcass ply 6A of carcass cords. The carcass ply 6A includes a main portion 6a extending between the bead cores 5, and a pair of turn-up portions 6b each turned up around the respective bead cores 5 from axially inside to the outside of the tire. As the carcass cords, an organic fiber cord, e.g., nylon, polyester, rayon or aramid may be employed. The carcass cords are oriented at an angle of from 70 to 90 degrees with respect to the tire equator C, for example. A pair of tapering bead apex rubber which extends radially outwardly from the respective bead cores 5 is disposed between the main portion 6a and the respective turn-up portions 6b.

The belt layer 7, in this embodiment, includes two belt plies 7A and 7B of belt cords which are oriented at an angle of from 15 to 45 degrees with respect to the tire equator C, for example. The belt plies 7A and 7B are overlapped such that the belt cords of each ply cross with each other. As the belt cords, high elastic modulus cords, e.g. steel, aramid or rayon cords may be employed.

Figure 2:
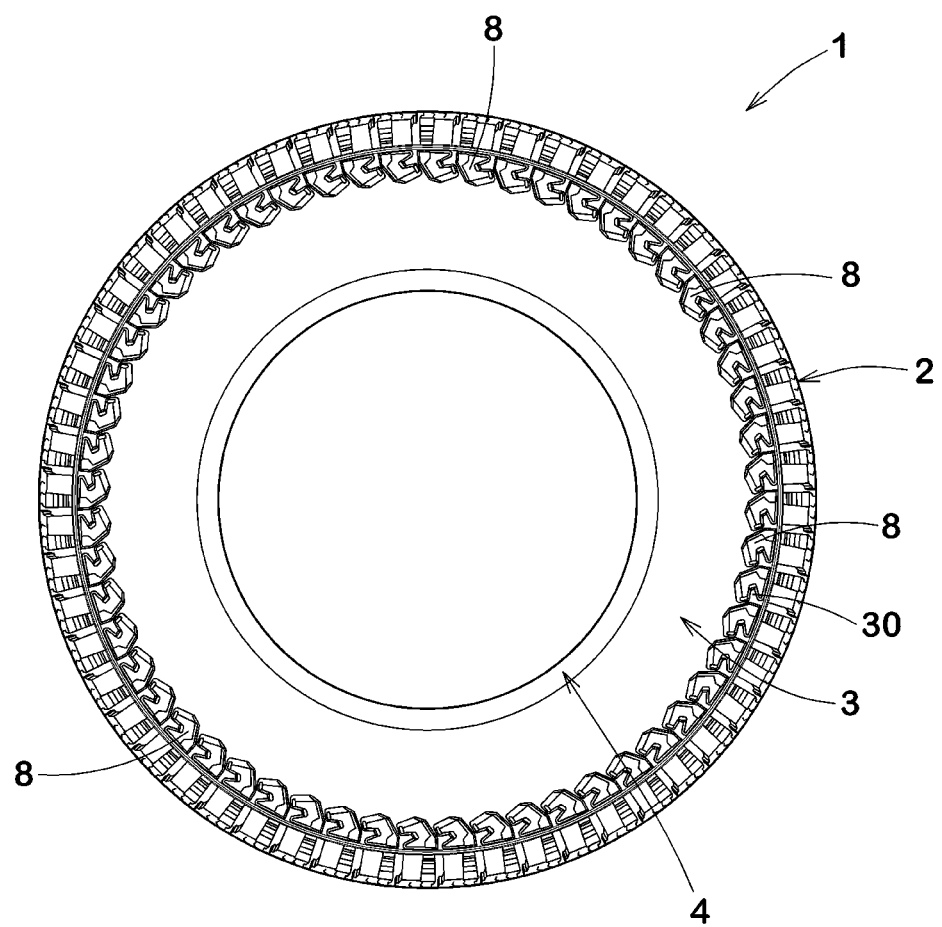
FIG. 2 is a side view of the pneumatic tire in FIG. 1.

FIG. 2 illustrates a side view of the tire 1. As illustrated in FIG. 2, the tire 1 according to the embodiment includes a plurality of protrusions 8 on an outer surface of at least one of the sidewall portions 3. In this embodiment, each of the protrusions 8, for example, is provided on a buttress surface 30 which is a radially outer region of the outer surface of the sidewall portion 3. The protrusions 8 are spaced in the tire circumferential direction. The protrusions 8 improve cut resistance of the sidewall portions 3, preventing sidewall portions 3 from damage.

Figure 3:
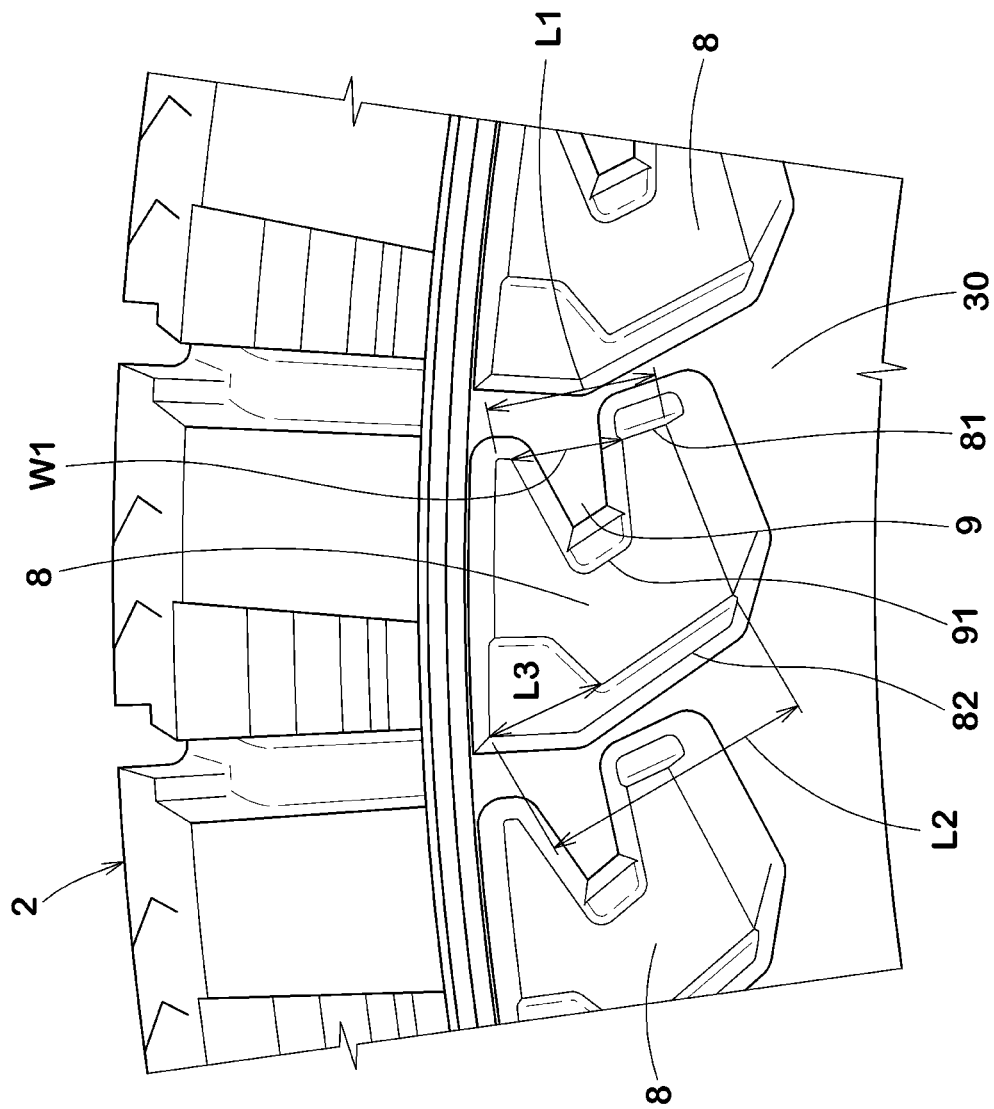
FIG. 3 is an enlarged view of protrusions in FIG. 2.

FIG. 3 illustrates an enlarged view of some protrusions 8. Each of the protrusions 8 includes a first end 81 in the tire circumferential direction and a recess 9 extending in the tire circumferential direction from the first end 81 and having a terminal end 91 terminating within the protrusion 8. Since the recess 9 is provided, heat accumulating property of the protrusion 8 tends to be lower (i.e. improving heat radiation property) and thus internal temperature of the protrusion 8 becomes low upon traveling. Thus, durability of the pneumatic tire 1 can be improved. Further, when the tire 1 travels over mud road conditions, the recess 9 can hold mud therein effectively, generating powerful traction.

As illustrated in FIG. 2, at least a part of one of the protrusions 8 is included in an arbitrary tire meridian cross-section including the tire axis. Thus, at least one of the sidewall portions 3 can be protected by at least a part of one of the protrusions 8 at an arbitrary tire meridian cross-section upon traveling.

As illustrated in FIG. 3, a width of the recess 9 measured along the first end 81 decreases gradually from the first end 81 toward the terminal end 91. This helps to enhance rigidity in the protrusions 8, improving cut resistance of the sidewall portion 3 further.

Preferably, the maximum width W1 of the recess 9 along the first end 81 is in a range of from 0.4 to 0.6 times a circumferential entire length L1 the recess in order to further improve the above-mentioned advantageous effect that suppresses internal temperature increase of the protrusion 8 while maintaining cut resistance of the sidewall portions 3. Note that the entire length L1 of the first end 81 is a distance from the radially inner end to the radially outer end of the first end 81.

Figure 4:
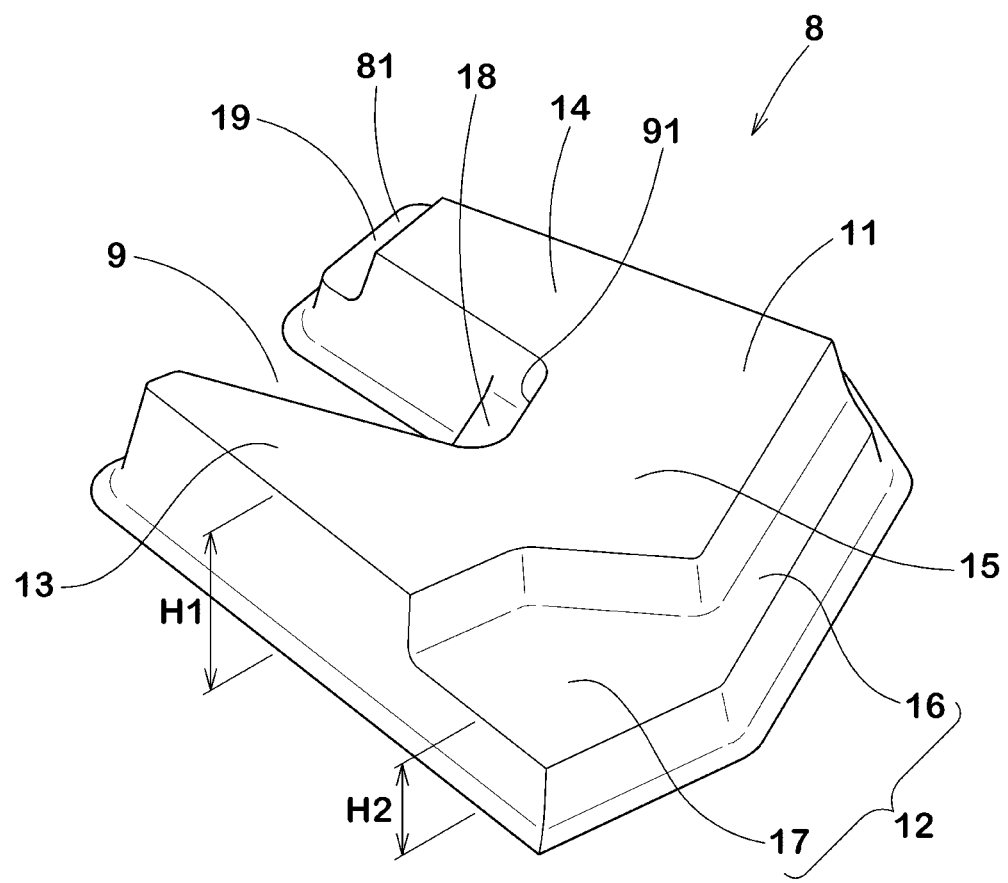
FIG. 4 is a perspective view of the protrusions in FIG. 2.

FIG. 4 illustrates a perspective view of one protrusion 8. In FIG. 4, for convenience of drawing the figure, a circular arc in the tire circumferential direction as well as a sidewall circular arc in the tire radial direction are illustrated as straight lines.

The protrusion 8 includes a first portion 11 having a first protruding height H1 and a second portion 12 having a second protruding height H2 which is lower than the first protruding height H1. Since the protrusions 8 includes the second portion 12, heat accumulating property of the protrusion 8 can further be reduced, and thus internal temperature of the protrusions 8 upon traveling can lower further. In addition, when the tire 1 travels in mud road conditions, the second portion 12 can hold mud effectively, generating powerful traction.

Preferably, the second protruding height H2 is in a range of from 0.5 to 0.7 times the first protruding height H1 in order to further improve the above-mentioned advantageous effect that suppresses internal temperature increase of the protrusion 8 while maintaining cut resistance of the sidewall portions 3.

The first portion 11 includes an outer rib portion 13 located radially outwardly of the recess 9, an inner rib portion 14 located radially inwardly of the recess 9, and a base portion 15 connecting the outer rib portion 13 and the inner rib portion 14. In this embodiment, the first portion 11 is configured as a C-shaped manner or horseshoe manner by the outer rib portion 13, the inner rib portion 14, and the base portion 15. Thus, the pneumatic tire 1 generates powerful traction in mud road conditions.

As illustrated in FIG. 3, each of the protrusions 8 includes a second end 82 at an opposite side to the first end 81. The second end 82 of the protrusion 8 faces the first end 81 of another protrusion 8 arranged adjacently thereto. The second portion 12 constitutes a part of the base portion 15 on the second end 82 side. The second portion 12 helps to suppress internal temperature increase of the protrusion 8 upon traveling while protecting the sidewall portion 3.

In this embodiment, a circumferential length of the second portion 12 increases toward radially outward stepwisely. Thus, the internal temperature increase can be suppressed effectively in a radially outer region of the protrusion 8. Alternatively, the circumferential length of second portion 12 may increases gradually toward radially outward.

In this embodiment, the second portion 12 includes a narrow portion 16 and a wide portion 17. The narrow portion 16 extends radially outwardly from the radially inner end of the protrusion 8 and has a constant circumferential length. The wide portion 17 is arranged radially outwardly of the narrow portion 16 and has a circumferential length larger than the circumferential length of the narrow portion 16. The wide portion 17 which is arranged on the second end 82 side of the protrusion 8 can hold and shear mud effectively upon traveling in mud road conditions, generating powerful traction.

In this embodiment, since the protrusions 8 includes the recess 9 provided on the first end 81 side and the wide portion 17 of the second portion 12 having a lower protruding height than the first portion 11 provided on the second end 82 side, either one of the recess 9 or the wide portion 17 can hold and shear mud so as to increase traction, regardless the rotation direction of the tire.

Preferably, the maximum length L3 of the wide portion 17 measured along the second end 82 is in a range of from 0.3 to 0.5 times the entire length L2 of the second end in order to further improve the advantageous effect that generates powerful traction while protecting the sidewall portion 3. Note that the entire length L2 of second end 82 shall mean a distance from the radially inner end portion to the radially outer end portion of the second end 82.

As illustrated in FIG. 4, the recess 9 may be provided with a third portion 18 having a third protruding height which is lower than the first protruding height H1. The third portion 18, for example, extends from the terminal end 91 of the recess 9 toward the first end 81 such that the outer rib portion 13, the inner rib portion 14, and the base portion 15 are connected with each other. The third portion 18 helps to enhance rigidity in the protrusions 8 so that the sidewall portion 3 can be protected further.

In another aspect of the disclosure, the fourth portion 19 having a fourth protruding height which is lower than the first protruding height H1 may be provided on an end region of the inner rib portion 14. The fourth portion 19 helps to enhance rigidity in the protrusions 8 so that the sidewall portion 3 can be protected further.

While the particularly preferable embodiments in accordance with the present disclosure have been described in detail, the present disclosure is not limited to the illustrated embodiments but can be modified and carried out in various aspects.

EXAMPLE

Pneumatic tires 265/70R17 having a basic structure as shown in FIG. 1 were manufactured by way of trial based on the specification in Table 1, and then cut resistance, heat radiation property, and traction performance in mud condition were tested. The test methods are as follows.

Cut Resistance Test:

Each test tire mounted onto a rim 17×8.00 with inner pressure of 240 kPa was installed on a four-wheel drive vehicle having a 4000-cc displacement. Then the test vehicle made to run on an off-road course which was covered with rubble. After running for 1500 km, cut damages occurring on the sidewalls were checked to calculate a total of cut areas each of which is obtained by multiply the cut length and the cut depth. The test results are shown in Table 1 using an index, wherein Example 1 is set to 100. The larger the value, the better the performance is.

Heat Radiation Property Test:

Each test tire was mounted onto a rim 17×8.00 with inner pressure of 240 kPa and then was made to run on a drum tester at 100 km/hr. for 24 hours. After running, temperature of the buttress portion on which the protrusions were provided were measured. The test results are shown in Table 1 using an index, wherein Example 1 is set to 100. The larger the value, the better the performance is.

Traction Performance Test:

Each test tire mounted onto a rim 1.7×8.00 with inner pressure of 240 kPa was installed on the above vehicle. Then a driver drove the test vehicle on a mud road test course and checked the traction property by the driver's sense. The test results are shown in Table 1 using an index, wherein Example 1 is set to 100. The larger the value, the better the traction performance is.

TABLE 1

|  | Ref. | Ex. 1 | Ex. 2 | Ex. 3 | Ex. 4 |
| --- | --- | --- | --- | --- | --- |
| Protrusions | presence | presence | presence | presence | presence |
| Recesses on protrusions | none | presence | presence | presence | presence |
| Ratio W1/L1 | — | 0.5 | 0.4 | 0.6 | 0.5 |
| First portion | presence | presence | presence | presence | presence |
| Second portion | none | presence | presence | presence | none |
| Ratio H2/H1 | — | 0.6 | 0.6 | 0.6 | — |
| Narrow portion | presence | presence | presence | presence | presence |
| Wide portion | none | presence | presence | presence | presence |
| Ratio L3/L2 | — | 0.4 | 0.4 | 0.4 | 0.4 |
| Cut resistance (index) | 100 | 100 | 105 | 90 | 105 |
| Heat radiation property (index) | 75 | 100 | 95 | 103 | 95 |
| Traction in mud (index) | 75 | 100 | 95 | 103 | 90 |

|  | Ex. 5 | Ex. 6 | Ex. 7 | Ex. 8 | Ex. 9 |
| --- | --- | --- | --- | --- | --- |
| Protrusions | presence | presence | presence | presence | presence |
| Recesses on protrusions | presence | presence | presence | presence | presence |
| Ratio W1/L1 | 0.5 | 0.5 | 0.5 | 0.5 | 0.5 |
| First portion | presence | presence | presence | presence | presence |
| Second portion | presence | presence | presence | presence | presence |
| Ratio H2/H1 | 0.5 | 0.7 | 0.6 | 0.6 | 0.6 |
| Narrow portion | presence | presence | presence | presence | presence |
| Wide portion | presence | presence | none | presence | presence |
| Ratio L3/L2 | 0.4 | 0.4 | — | 0.3 | 0.5 |
| Cut resistance (index) | 90 | 105 | 120 | 105 | 90 |
| Heat radiation property (index) | 103 | 95 | 85 | 95 | 103 |
| Traction in mud (index) | 103 | 95 | 85 | 95 | 103 |

As is evident from Table 1, it is confirmed that the example pneumatic tires have improved cut resistance, heat radiation property and traction in mud, compared to the comparative example tires.

What is claimed is:

1. A pneumatic tire comprising:
    a pair of sidewall portions, at least one of the pair of sidewall portions being provided with circumferentially spaced protrusions protruding axially outwardly; and each of the protrusions comprising a first end in a tire circumferential direction and a recess extending in the tire circumferential direction from the first end and having a terminal end terminating within the protrusion, wherein each of the protrusions comprises a first portion having a first protruding height, a second portion having a second protruding height lower than the first protruding height, and a third portion having a third protruding height lower than the first protruding height, the first portion comprises an outer rib portion located radially outwardly of the recess, an inner rib portion located radially inwardly of the recess, and a base portion connecting the outer rib portion and the inner rib portion, and the third portion extends from the terminal end of the recess toward the first end such that the outer rib portion, the inner rib portion, and the base portion are connected with each other via the third portion.

2. The pneumatic tire according to claim 1, wherein at least a part of one of the protrusions appears in an arbitrary tire meridian cross-section including a tire axis.

3. The pneumatic tire according to claim 1, wherein the recess has a width measured along the first end, and the width decreases gradually toward the terminal end.

4. The pneumatic tire according to claim 1, wherein the recess has a maximum width measured along the first end, and the maximum width is in a range of from 0.4 to 0.6 times an entire length of the first end.

5. The pneumatic tire according to claim 1, wherein the second protruding height is in a range of from 0.5 to 0.7 times the first protruding height.

6. The pneumatic tire according to claim 1, wherein each of the protrusions comprises a second end in the tire circumferential direction at an opposite side to the first end, and the second portion is arranged on the second end side of the base portion.

7. The pneumatic tire according to claim 6, wherein a circumferential length of the second portion increases toward radially outward gradually or in a stepwise manner.

8. The pneumatic tire according to claim 7, wherein
the second portion extends radially outwardly from a radially inner end of the protrusion, and
the second portion comprises a narrow portion having a constant circumferential length, and a wide portion arranged radially outwardly of the narrow portion and having a circumferential length larger than the circumferential length of the narrow portion.

9. The pneumatic tire according to claim 8, wherein the wide portion has a maximum length along the second end in a range of from 0.3 to 0.5 times an entire length of the second end.

10. The pneumatic tire according to claim 2, wherein the recess has a width measured along the first end, and the width decreases gradually toward the terminal end.

11. The pneumatic tire according to claim 2, wherein the recess has a maximum width measured along the first end, and the maximum width is in a range of from 0.4 to 0.6 times an entire length of the first end.

12. The pneumatic tire according to claim 3, wherein the recess has a maximum width measured along the first end, and the maximum width is in a range of from 0.4 to 0.6 times an entire length of the first end.

13. The pneumatic tire according to claim 2, wherein each of the protrusions comprises a first portion having a first protruding height and a second portion having a second protruding height lower than the first protruding height.

14. The pneumatic tire according to claim 3, wherein each of the protrusions comprises a first portion having a first protruding height and a second portion having a second protruding height lower than the first protruding height.

15. The pneumatic tire according to claim 1, wherein the first portion and the second portion are directly connected with each other so as to form a step shaped surface on each of the protrusions.

16. The pneumatic tire according to claim 1, wherein the recess is inclined toward inwardly in a tire radial direction from the first end to the terminal end continuously.

17. The pneumatic tire according to claim 1, wherein
each of the protrusions further comprises a fourth portion having a fourth protruding height lower than the first protruding height, and
the fourth portion is provided on an end region of the inner rib portion.

18. The pneumatic tire according to claim 1, wherein
each of the protrusions comprises a second end in the tire circumferential direction opposite the first end,
the outer rib portion has a width in a tire radial direction, and
the width of the outer rib portion decreases continuously to the first end from the second end side.

* * * * *